(12) United States Patent
Takimoto et al.

(10) Patent No.: US 11,237,071 B2
(45) Date of Patent: Feb. 1, 2022

(54) SHIELD STRUCTURE FOR PRESSURE SENSOR, AND PRESSURE SENSOR PROVIDED WITH SAME

(71) Applicant: Saginomiya Seisakusho, Inc., Tokyo (JP)

(72) Inventors: Kazuya Takimoto, Sayama (JP); Tatsuya Tanaka, Sayama (JP); Tomoharu Oba, Tokorozawa (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 61 days.

(21) Appl. No.: 16/767,287

(22) PCT Filed: Oct. 26, 2018

(86) PCT No.: PCT/JP2018/040000
§ 371 (c)(1),
(2) Date: May 27, 2020

(87) PCT Pub. No.: WO2019/107037
PCT Pub. Date: Jun. 6, 2019

(65) Prior Publication Data
US 2020/0400523 A1  Dec. 24, 2020

(30) Foreign Application Priority Data
Nov. 30, 2017 (JP) .............................. JP2017-230549

(51) Int. Cl.
*G01L 19/14* (2006.01)
*G01L 19/00* (2006.01)
*G01L 19/06* (2006.01)

(52) U.S. Cl.
CPC ........ *G01L 19/146* (2013.01); *G01L 19/0084* (2013.01); *G01L 19/0645* (2013.01)

(58) Field of Classification Search
CPC ............. G01L 19/0645; G01L 19/0084; G01L 19/146

(Continued)

(56) References Cited

U.S. PATENT DOCUMENTS

2012/0042735 A1* 2/2012 Mei ..................... G06F 3/04142
73/862.636

FOREIGN PATENT DOCUMENTS

JP  2003-302300 A  10/2003
JP  2004-219205 A  8/2004

(Continued)

OTHER PUBLICATIONS

Translation of WO-2007004400-A1 (Year: 2007).*

(Continued)

*Primary Examiner* — Nathaniel T Woodward
(74) *Attorney, Agent, or Firm* — Workman Nydegger

(57) ABSTRACT

In a pressure sensor, a cap-shaped shielding member (17) to block an electric field undesirable for a signal processing electronic circuit unit of a sensor chip (16) is supported by an end surface of a disk conductive plate (19) between one end surface of the sensor chip (16) in a liquid sealing chamber (13) and a diaphragm (32). The conductive plate (19) is electrically connected via a group of input-output terminals (40*ai*) and bonding wires (Wi), for example, and the sensor chip 16 is supported by one end portion of a chip mounting member (18) which is electrically connected via the group of input and output terminals (40*ai*) and the bonding wires (Wi).

13 Claims, 14 Drawing Sheets

(58) Field of Classification Search
USPC .......................................................... 73/756
See application file for complete search history.

(56) References Cited

FOREIGN PATENT DOCUMENTS

| JP | 2006-208383 A | 8/2006 | |
|---|---|---|---|
| JP | 3987386 B | 7/2007 | |
| JP | 2008-072185 A | 3/2008 | |
| WO | 2004/048914 A1 | 6/2004 | |
| WO | 2007/004400 A1 | 1/2007 | |
| WO | WO-2007004400 A1 * | 1/2007 | ......... G01L 19/0645 |

OTHER PUBLICATIONS

International Preliminary Report on Patentability dated Jun. 20, 2020, issued in PCT Application No. PCT/JP2018/040000, filed Oct. 26, 2018.
Japanese Office Action and English Translation from Application No. 2020-180551, dated Apr. 14, 2021.
Chinese Office Action, dated Nov. 17, 2021, from Chinese Application No. 201880076811.6 filed Oct. 26, 2018.

* cited by examiner

US 11,237,071 B2

SHIELD STRUCTURE FOR PRESSURE SENSOR, AND PRESSURE SENSOR PROVIDED WITH SAME

TECHNICAL FIELD

The present invention relates to a shield structure for a pressure sensor and a pressure sensor provided with the same.

BACKGROUND ART

As shown in PATENT DOCUMENT 1, for example, a sensor unit to be built in a liquid sealing semiconductor pressure sensor comprises, as its main elements: a metallic diaphragm supported inside a joint and configured to isolate a pressure detection chamber from a liquid sealing chamber to be described below; the liquid sealing chamber formed above the metallic diaphragm and configured to accommodate a silicone oil serving as a pressure transmitting medium; a sensor chip provided in the liquid sealing chamber and configured to detect a variation in pressure in the silicone oil via the metallic diaphragm; a sensor chip mounting member configured to support the sensor chip; a hermetic glass configured to establish hermetic seal around the sensor chip mounting member in a through hole of a housing; and a group of terminals (lead pins) configured to send an output signal from the sensor chip and to supply electric power to the sensor chip.

In the above-described configuration, the metallic diaphragm, a base plate, and the joint are connected to one another at the same electric potential while these regions are insulated from the sensor chip. In a case where a primary power supply being a power source is insufficiently insulated from a secondary power supply being a control circuit to process the output signal from the sensor chip, an electric potential difference occurs between the metallic diaphragm and the sensor chip, which are located opposite to each other, because impedance on the sensor chip side is higher. To avoid an effect (a variation in output from the pressure sensor) on an electronic circuit and on a non-volatile memory in such a sensor chip attributed to electric potential difference occurring both on the metallic diaphragm and on the sensor chip, provision of a metallic lower plate and a metallic member provided on an end surface of a hermetic glass in such a way as to surround the sensor chip and to define a cylindrical space has been proposed as shown in PATENT DOCUMENT 1, for example. The sensor chip is electrically connected to lead pins and a metallic member, which are coupled via a presser plate to a zero potential of an electronic circuit that is integrated in the sensor chip. Hereby, because the electric potentials of the lower plate and the metallic member become equal to the zero potential of the electronic circuit of the sensor chip located in the space surrounded by the lower plate and the metallic member, there is no difference in electric potential between the metallic diaphragm and the sensor chip. Accordingly, there is no risk of occurrence of an electric field that may affect the electronic circuit of the sensor chip.

PRIOR ART DOCUMENT

Patent Document

PATENT DOCUMENT 1: Japanese Patent No. 3,987,386

SUMMARY OF INVENTION

In addition, as a measure in this case, it can be considered that the way connecting the lead pins to the zero potential of the electronic circuit integrated in the sensor chip is available by further disposing a presser plate like the one mentioned above, which is to be connected to lead pins projecting from another end surface of the hermetic glass located away from the aforementioned liquid sealing chamber, or achieving electrical connection to the lead pins in another process, for example.

However, the above measure is inadvisable because the necessities of the arrangement of the additional presser plate and the operation to connect the lead pins to the presser plate result in an increase in the number of components of the pressure sensor and an increase in the number of assembly operation processes.

In view of the above-described problem, the present invention aims to provide a shield structure for a pressure sensor and a pressure sensor provided with the same. The shield structure for a pressure sensor and a pressure sensor provided with the same can reduce an effect of an electric field occurring between a sensor chip and a metallic diaphragm in the pressure sensor without causing increases in the number of components and in assembly operation processes.

To achieve the above-described object, a shield structure for a pressure sensor according to the present invention comprises: a sensor unit including a sensor chip for detecting a pressure and sending a detection output signal, a chip mounting member supporting the sensor chip, a diaphragm for partitioning a liquid sealing chamber which the sensor chip and the chip mounting member are placed into a pressure chamber facing the liquid sealing chamber, and a group of input-output terminals supported by a hermetic glass and electrically connected to the sensor chip; and an electric field blocking member placed between one end surface of the sensor chip in the liquid sealing chamber and the diaphragm by being supported from a conductive plate electrically connected to the group of input-output terminals, and for blocking an electric field acting on a signal processing electronic circuit unit of the sensor chip. The conductive plate may be placed on an end surface of the hermetic glass and electrically connected to the group of input-output terminals. The conductive plate and the signal processing electronic circuit unit of the sensor chip may have an equal electric potential.

In addition, another shield structure for a pressure sensor according to the present invention comprises: a sensor unit including a sensor chip for detecting a pressure and sending a detection output signal, a diaphragm for partitioning a liquid sealing chamber which the sensor chip is placed into a pressure chamber facing the liquid sealing chamber, and a group of input-output terminals electrically connected to the sensor chip; and an electric field blocking member placed between one end surface of the sensor chip in the liquid sealing chamber and the diaphragm by being supported from a conductive plate electrically connected to the group of input-output terminals, and for blocking an electric field acting on a signal processing electronic circuit unit of the sensor chip. The conductive plate may be placed on an inner peripheral surface of a sensor housing that accommodates the sensor unit and electrically connected to the group of input-output terminals. The conductive plate and the signal processing electronic circuit unit of the sensor chip may have an equal electric potential.

Moreover, another shield structure for a pressure sensor according to the present invention comprises: a sensor unit including a sensor chip for detecting a pressure and sending a detection output signal, a chip mounting member supporting the sensor chip, a diaphragm for partitioning a liquid sealing chamber which the sensor chip and the chip mounting member are placed into a pressure chamber facing the liquid sealing chamber, and a group of input-output terminals supported by a hermetic glass and electrically connected to the sensor chip; and an electric field blocking member placed between one end surface of the sensor chip in the liquid sealing chamber and the diaphragm by being placed on an end surface of the hermetic glass and electrically connected to the group of input-output terminals, and for blocking an electric field acting on a signal processing electronic circuit unit of the sensor chip. The electric field blocking member and the signal processing electronic circuit unit of the sensor chip may have an equal electric potential.

Furthermore, another shield structure for a pressure sensor according to the present invention comprises: a sensor unit including a sensor chip for detecting a pressure and sending a detection output signal, a chip mounting member supporting the sensor chip, a diaphragm for partitioning a liquid sealing chamber which the sensor chip and the chip mounting member are placed into a pressure chamber facing the liquid sealing chamber, and a group of input-output terminals electrically connected to the sensor chip and to the chip mounting member; and an electric field blocking member placed between one end surface of the sensor chip in the liquid sealing chamber and the diaphragm by being provided on an end surface of the chip mounting member and electrically connected to the group of input-output terminals, and for blocking an electric field acting on a signal processing electronic circuit unit of the sensor chip. The electric field blocking member and the signal processing electronic circuit unit of the sensor chip may have an equal electric potential.

A pressure sensor according to the present invention comprises: a sensor unit including a sensor chip for detecting a pressure and sending a detection output signal, a chip mounting member supporting the sensor chip, a diaphragm for partitioning a liquid sealing chamber which the sensor chip and the chip mounting member are placed into a pressure chamber facing the liquid sealing chamber, and a group of input-output terminals supported by a hermetic glass and electrically connected to the sensor chip; an electric field blocking member placed between one end surface of the sensor chip in the liquid sealing chamber and the diaphragm by being supported from a conductive plate electrically connected to the group of input-output terminals, and for blocking an electric field acting on a signal processing electronic circuit unit of the sensor chip; and a sensor unit accommodating portion storing the sensor unit and the electric field blocking member.

Hereby, another pressure sensor according to the present invention comprises: a sensor unit including a sensor chip for detecting a pressure and sending a detection output signal, a diaphragm for partitioning a liquid sealing chamber which the sensor chip is placed into a pressure chamber facing the liquid sealing chamber, and a group of input-output terminals electrically connected to the sensor chip; an electric field blocking member placed between one end surface of the sensor chip in the liquid sealing chamber and the diaphragm by being supported from a conductive plate electrically connected to the group of input-output terminals, and for blocking an electric field acting on a signal processing electronic circuit unit of the sensor chip; and a sensor unit accommodating portion storing the sensor unit and the electric field blocking member. The electric field blocking member and the signal processing electronic circuit unit of the sensor chip may have an equal electric potential.

The shield structure for a pressure sensor and the pressure sensor provided with the same according to the present invention include the electric field blocking member which is placed between the one end surface of the sensor chip in the liquid sealing chamber and the diaphragm by being supported from the conductive plate electrically connected to the group of input-output terminals and for blocking an electric field acting on the signal processing electronic circuit unit of the sensor chip. Thus, it is possible to reduce an effect of an electric field occurring between a sensor chip and a metallic diaphragm in a pressure sensor without causing increases in the number of components and in assembly operation processes.

DESCRIPTION OF EMBODIMENTS

Figure 3:
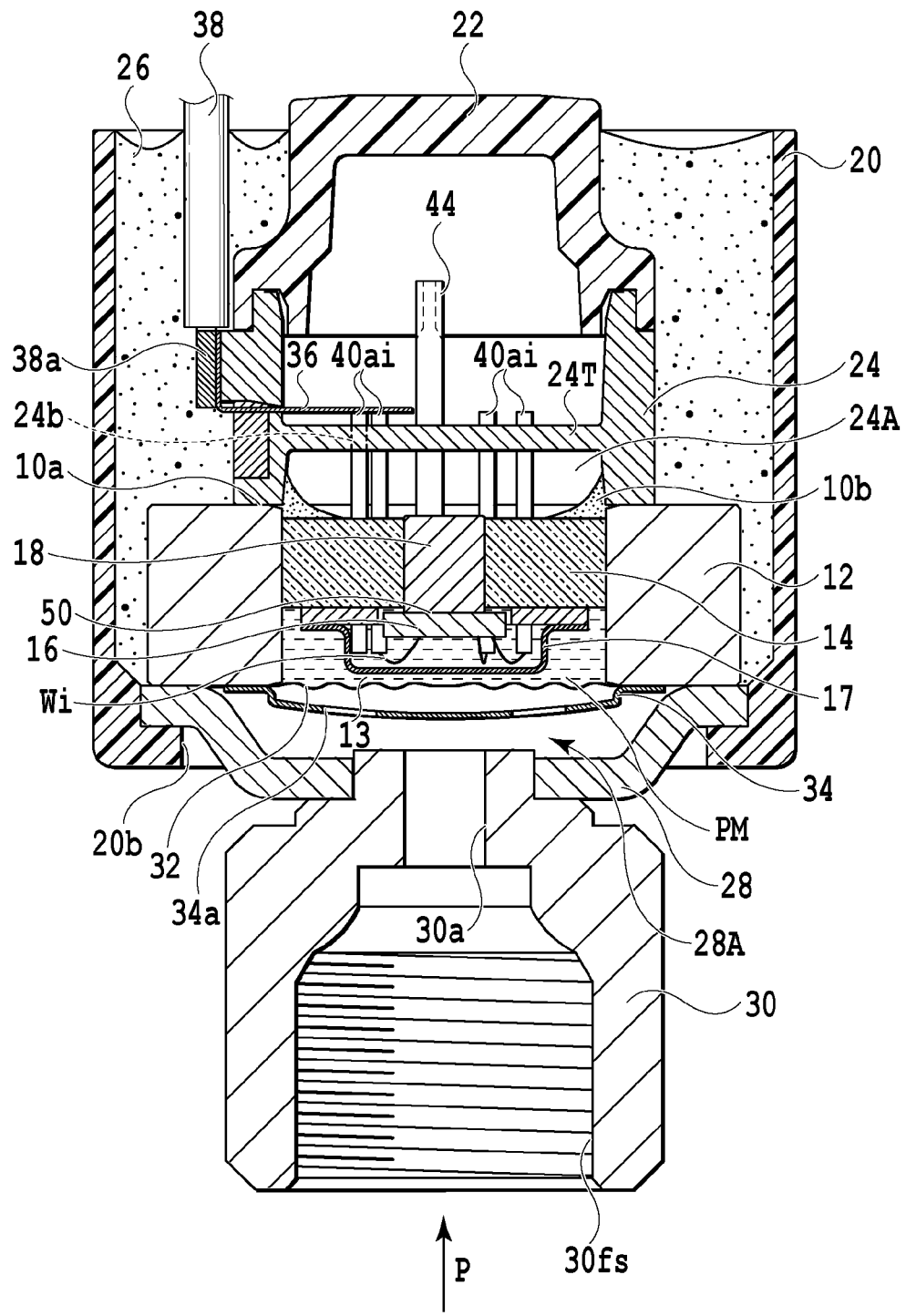
FIG. 3 is a cross-sectional view showing a configuration of an example of a pressure sensor applying the example of the shield structure for a pressure sensor shown in FIG. 1.

FIG. 3 schematically illustrates a configuration of a pressure sensor applying an example of a shield structure for a pressure sensor according to the present invention.

In FIG. 3, a pressure sensor comprises: a joint member 30 to be coupled to a piping into which a fluid supposed to undergo pressure detection is introduced; and a sensor unit accommodating portion which is joined to a base plate 28 of the joint member 30 by brazing or the like, for example, accommodates a sensor unit to be described later, and supplies a detection output signal from the sensor chip to a given pressure measurement apparatus.

The joint member 30 made of metal has a female screw portion 30fs on its inside to be screwed into a male screw portion of a connector portion of the aforementioned piping. The female screw portion 30fs is communicated with a port 30a of the joint member 30 which brings the fluid supplied in a direction indicated with an arrow P to a pressure chamber 28A to be described later. One of open ends of the port 30a is open toward the pressure chamber 28A formed between the base plate 28 of the joint member 30 and a diaphragm 32 of the sensor unit.

A contour portion of the sensor unit accommodating portion is formed as a cover member from a cylindrical waterproof case 20. An opening 20b is formed at a lower end portion of the waterproof case 20 that is made of resin. A peripheral edge portion of the base plate 28 of the joint member 30 is engaged with a stepped portion on a peripheral edge of the opening 20b inside the case 20.

A pressure of the fluid is brought into the pressure chamber 28A through the port 30a of the joint member 30.

A lower end surface of a housing 12 of the sensor unit is coupled by welding to the peripheral edge portion of the base plate 28.

The sensor unit for detecting the pressure inside the pressure chamber 28A and sending a detection output signal comprises, as its main elements, the cylindrical housing 12 made of metal, the diaphragm 32 made of metal and configured to isolate the pressure chamber 28A from an inner peripheral portion of the housing 12, a sensor chip 16 provided with a plurality of pressure detection elements and a signal processing electronic circuit unit to process signals from the pressure detection elements, a chip mounting member 18 made of metal and configured to support the sensor chip 16 at an end portion through an adhesive layer 50, a group of input-output terminals 40ai (i=1 to 8) electrically connected to the sensor chip 16, and a hermetic glass 14 configured to fix the group of input-output terminals 40ai and an oil filling pipe 44 to a portion between an outer peripheral surface of the chip mounting member 18 and an inner peripheral surface of the housing 12.

The diaphragm 32 is supported by one lower end surface of the housing 12 face to face relationship with the above-mentioned pressure chamber 28A. A diaphragm protection cover 34 to protect the diaphragm 32 provided in the pressure chamber 28A has a plurality of communication holes 34a. A peripheral edge of the diaphragm protection cover 34 is joined by welding to the lower end surface of the housing 12 together with a peripheral edge of the diaphragm 32. The housing 12, the diaphragm 32, the base plate 28, and the joint member 30 are connected to and conducted with one another and therefore have the same electric potential. In addition, the group of input-output terminals 40ai and the chip mounting member 18 are held by being insulated from the housing 12 by using an insulator such as the hermetic glass 14.

A liquid sealing chamber 13 formed between the diaphragm 32 made of metal and the sensor chip 16, an end surface of the hermetic glass 14 face to face relationship with the diaphragm 32 is filled with a predetermined amount of a pressure transmitting medium PM such as a silicone oil and a fluorine-based inert liquid via the oil filling pipe 44. Note that one end portion of the oil filling pipe 44 is squashed and occluded after the oil filling as indicated with chain double-dashed lines.

The group of input-output terminals 40ai (i=1 to 8) is comprised of two power supply terminals, one output terminal, and five adjustment terminals. Both end portions of each terminal project from an end portion of the above-mentioned hermetic glass 14 toward the liquid sealing chamber 13 or toward a hole 24b in a terminal block 24 to be described later. The two power supply terminals and the one output terminal are connected to core wires 38a of respective lead wires 38 through connection terminals 36. Each lead wire 38 is connected to a predetermined pressure measurement apparatus, for example. Note that FIG. 3 illustrates only four terminals out of the eight terminals. The group of input-output terminals 40ai are connected to the sensor chip 16 to be described later by using bonding wires Wi.

The terminal block 24 to align the group of input-output terminals 40ai is molded by using a resin material such as polybutylene terephthalate (PBT) as a key component. The terminal block 24 has the plurality of holes 24b into which the group of input-output terminals 40ai are inserted, and a hollow portion 24A having a predetermined volume inside. A terminal alignment portion 24T has the plurality of holes 24b located away from one another and is integrally molded in such a way as to orthogonally intersect the above-mentioned base end portion. A lower end surface of the base end portion of the terminal block 24 as an adhesion surface is attached to an upper end surface of the housing 12 by using a silicone-based adhesive. Hereby, an annular adhesive layer 10a having a predetermined thickness is formed on the upper end surface of the housing 12. Further, a coating layer 10b made of a silicone-based adhesive is formed in a predetermined thickness on the entire upper end surface of the hermetic glass 14 from which the group of input-output terminals 40ai project.

A space between an inner peripheral surface of the waterproof case 20 and an outer peripheral surface of the terminal block 24 serving as a terminal alignment member as well as an outer peripheral surface of an end cap 22 connected to the terminal block 24 and covering the holes 24b in the terminal alignment portion 24T mentioned above as well as an open end at an upper part of the terminal block 24, and a space between the inner peripheral surface of the waterproof case 20 and an outer peripheral surface of the housing 12 are filled with a given amount of a sealing medium 26. The terminal block 24 and the end cap 22 are facing the base plate 28 of the joint member 30 while interposing the above-described sensor unit and are disposed in the waterproof case 20. An upper end surface of the end cap 22 projects upward from an open end of the waterproof case 20. Namely, a position of the upper end surface of the end cap 22 is located at a higher position than a position of an open end surface of the waterproof case 20.

Figure 1:
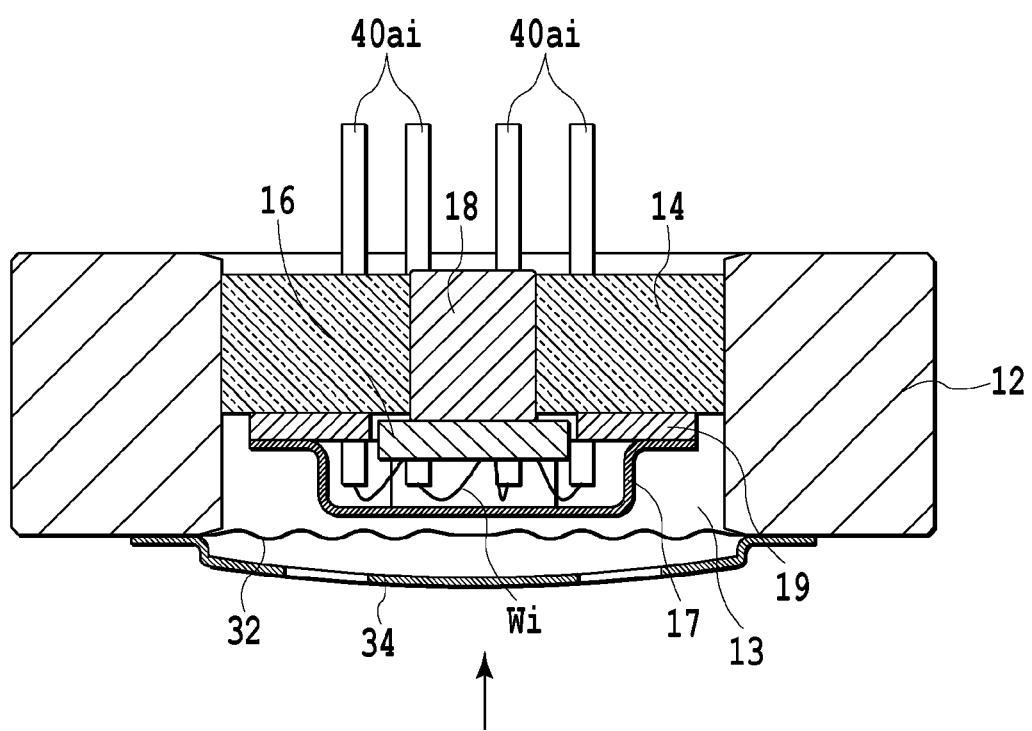
FIG. 1 is a cross-sectional view showing the essential parts of an example of a shield structure for a pressure sensor according to the present invention.

The sensor chip 16 is adhered to one end portion of the chip mounting member 18 located inside the liquid sealing chamber 13 through the adhesive layer 50, for example. As shown in FIG. 1, an external size of the sensor chip 16 having a substantially rectangular shape is set larger than a diameter of the chip mounting member 18.

In the liquid sealing chamber 13, a disk conductive plate 19 is supported by one of end surfaces of the hermetic glass 14 in such a way as to surround the sensor chip 16, for example. The conductive plate 19 is made of an insulating material which is one of resin, glass, and ceramic, and one of end surfaces thereof is formed out of a metallic film and integrated with the metallic film of gold, silver, copper, aluminum, or the like serving as a conductive layer, which is formed by adherence, vapor deposition, plating, or the like. The one end surface of the conductive plate 19 provided with the conductive layer as mentioned above is opposed to the diaphragm 32 and the other end surface being an insulating layer of the conductive plate 19 is supported by the hermetic glass 14.

In addition, a shielding member 17 serving as an electric field blocking member is provided between one of end surfaces of the sensor chip 16 and the diaphragm 32 in the liquid sealing chamber 13. The shielding member 17 is configured to block an electric field undesirable for the signal processing electronic circuit unit of the sensor chip 16.

The shielding member 17 may be formed from a conductive metal material such as stainless steel, copper, and aluminum, for example. Further, the shielding member 17 may be formed from an insulating material such as resin, glass, and ceramic with its surface layer being provided and integrated with film-formed conductive metal by adhesion, vapor deposition, sputtering, plating, and the like, for example.

Figure 2:
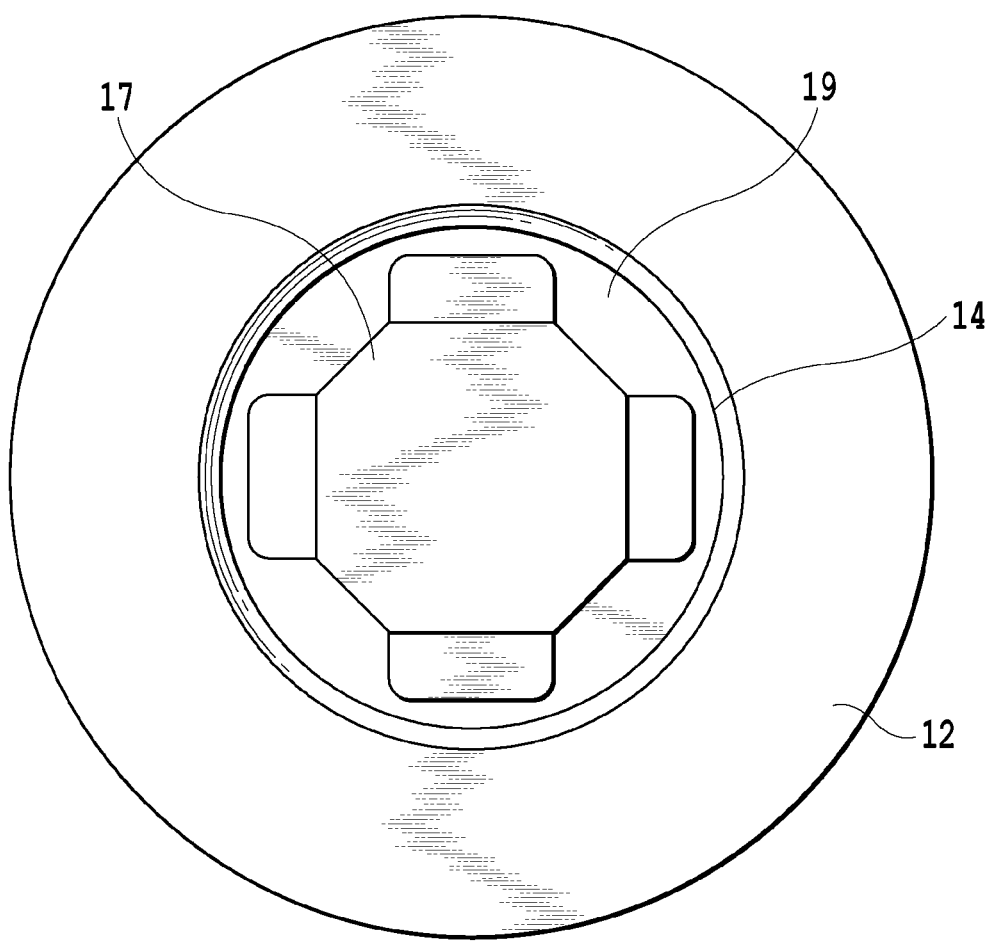
FIG. 2 is an arrow view of an electric field blocking member provided in a liquid sealing chamber, which is viewed from an arrow illustrated in FIG. 1.

As shown in FIG. 2, four fixing end portions of the cap-shaped shielding member 17 are brought close to an outer peripheral portion of the sensor chip 16 on the one end surface of the disk conductive plate 19, and are joined to and conducted with the outer peripheral portion. Although illustration is omitted, a plurality of openings are provided in a side surface of the shielding member 17. A shape of the shielding member 17 is formed into a shape that enables the pressure transmitting medium PM to move such that a pressure in accordance with a displacement of the diaphragm 32 propagates to the sensor chip 16 through the pressure transmitting medium PM.

The conductive plate 19 is connected to and conducted with one or more of the group of input-output terminals 40ai through e.g. a zero (V) terminal and the bonding wire Wi. According to this configuration described above, the electric potentials of the shielding member 17 and the conductive plate 19 are set to the same electric potential as that of the electronic circuit mounted in the sensor chip 16.

A predetermined clearance is formed between a portion of the shielding member 17 covering the entire sensor chip 16 and the end surface of the sensor chip 16. Note that an external size of the shielding member 17 may be appropriately set according to the size of the signal processing electronic circuit unit of the sensor chip 16 so as to block the electric field undesirable for the signal processing electronic circuit unit of the sensor chip 16.

Accordingly, as a consequence of disposing the shielding member 17 having the same electric potential as the electric potential of the sensor chip 16 between the diaphragm 32 and the signal processing electronic circuit unit of the sensor chip 16, an electric field to act on the sensor chip 16, which occurs due to a potential difference between the diaphragm 32 having the same electric potential as that of a primary power supply (not shown) of the unit and a control circuit (not shown) side, is blocked by the shielding member 17. Moreover, since the electric potential of the shielding member 17 and that of the sensor chip 16 are set to the same electric potential, no electric field occurs therebetween. For this reason, because the potential difference that occurs between the sensor chip 16 and the diaphragm 32 does not act on the sensor chip 16, it is possible to prevent an effect on the electronic circuit in the sensor chip 16.

Figure 4:
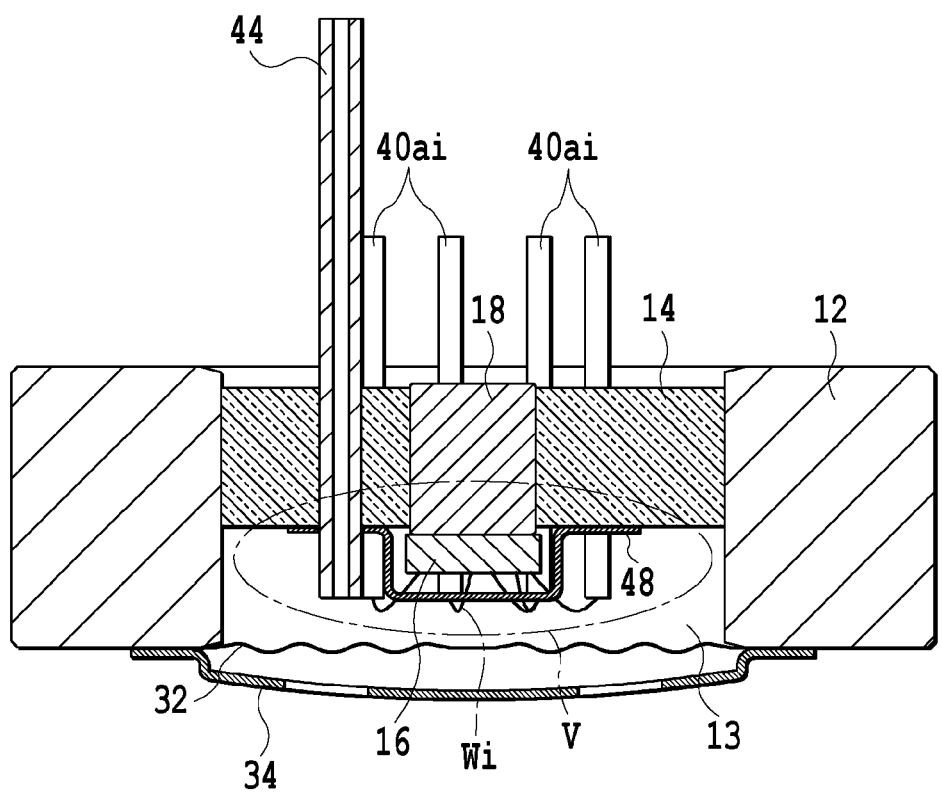
FIG. 4 is a cross-sectional view showing the essential parts of another example of the shield structure for a pressure sensor according to the present invention.

FIG. 4 partially shows the essential parts of the pressure sensor applying another example of the shield structure for a pressure sensor according to the present invention.

In the example shown in FIG. 1, the four fixing end portions of the cap-shaped shielding member 17 are brought close to the outer peripheral portion of the sensor chip 16 on the end surface of the disk conductive plate 19 and are joined to the end surface, for example. Instead, an example shown in FIG. 4 is designed such that a shielding plate 48 is supported on the end surface of the hermetic glass 14 in the liquid sealing chamber 13.

Figure 5:
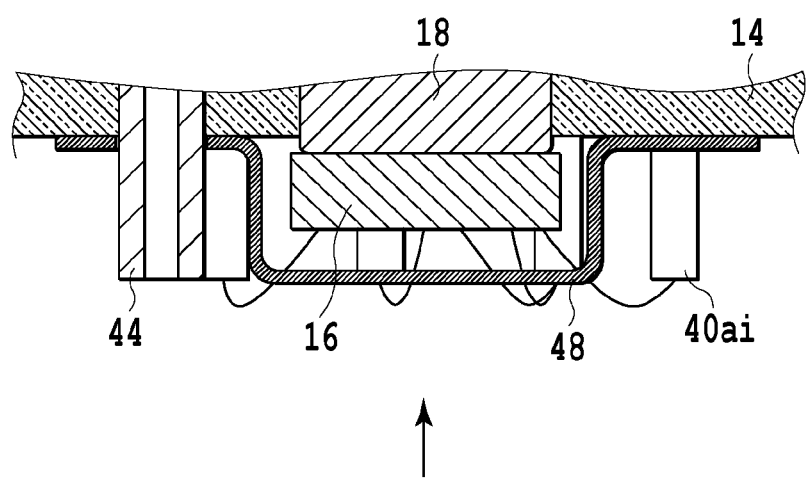
FIG. 5 is a partial enlarged view showing a partial enlarged portion V in the example shown in FIG. 4.
Figure 6:
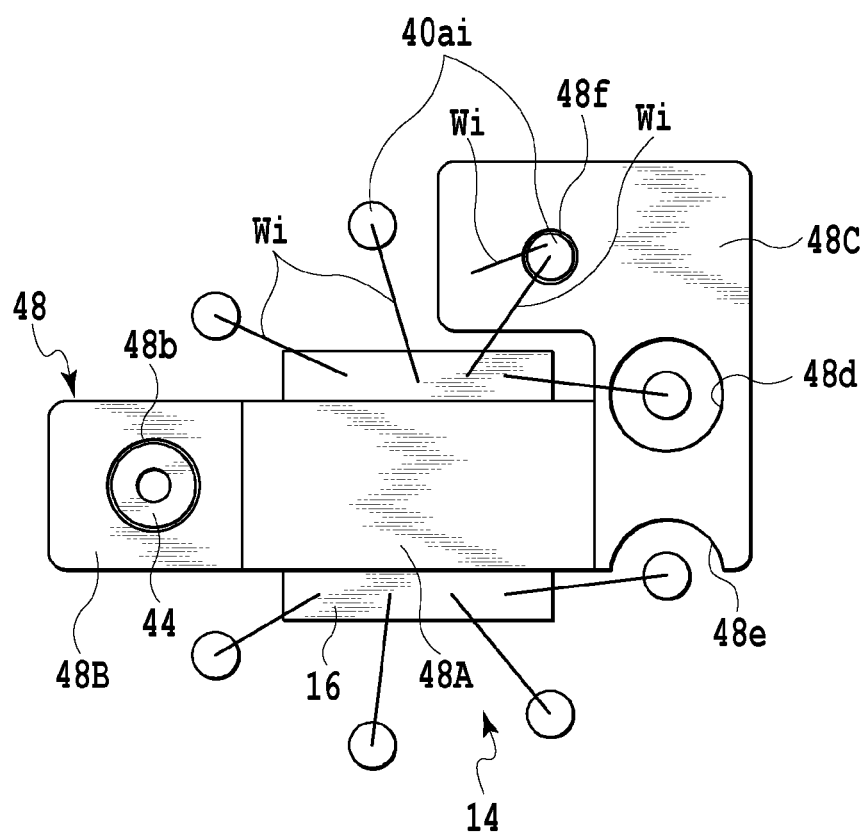
FIG. 6 is an arrow view of the electric field blocking member provided in the liquid sealing chamber, which is viewed from an arrow illustrated in FIG. 5.

Note that constituents in FIGS. 4 to 6 which are the same as the constituents in the example shown in FIGS. 1 to 3 will be indicated by the similar reference characters and overlapping explanations thereof will be omitted.

Though the illustration is omitted, this pressure sensor also comprises: a joint member to be coupled to a piping into which a fluid supposed to undergo pressure detection is introduced; and a sensor unit accommodating portion which is joined to a base plate of the joint member, accommodates a sensor unit to be described later, and supplies a detection output signal from the sensor chip to a given pressure measurement apparatus.

The shielding plate 48 serving as the electric field blocking member is provided between the one end surface of the sensor chip 16 and the diaphragm 32 in the liquid sealing chamber 13. The shielding plate 48 is configured to block an electric field undesirable for the signal processing electronic circuit unit of the sensor chip 16. The shielding plate 48 may be formed from a conductive metal material such as stainless steel, copper, and aluminum, for example. Alternatively, the shielding plate 48 may be formed from an insulating material such as resin, glass, and ceramic with one of its surface layers being formed and integrated with a conductive layer of conductive metal formed by adhesion, vapor deposition, sputtering, plating, and the like. As shown in FIG. 6, the strip-shaped shielding plate 48 comprises a trench-shaped portion 48A facing the one end surface of the sensor chip 16, and a first fixing portion 48B and a second fixing portion 48C continued to both end portions of the trench-shaped portion 48A. The trench-shaped portion 48A, the first fixing portion 48B, and the second fixing portion 48C are integrally molded by press work, for example. The trench-shaped portion 48A passes immediately above a central part of the sensor chip 16 with a predetermined clearance. The oil filling pipe 44 is press-fitted into a hole 48b in the first fixing portion 48B, and the respective group of input-output terminals 40ai projecting from the end surface of the hermetic glass 14 are inserted into holes 48f and 48d and a notch portion 48e of the second fixing portion 48C. Hereby, the first fixing portion 48B and the second fixing portion 48C come close to the outer peripheral portion of the sensor chip 16 at the one end portion of the chip mounting member 18 and come into contact with and get supported by the end surface of the hermetic glass 14.

The second fixing portion 48C is conducted with one of the group of input-output terminals 40ai, e.g. the zero (V) terminal, which are connected to the one end surface being a conductive surface of the shielding plate 48 through the bonding wire Wi. According to this configuration described above, the electric potential of the conductive surface being the one end surface of the shielding plate 48 is set to the same electric potential as that of the electronic circuit mounted in the sensor chip 16.

Note that an external size and a width dimension of the shielding plate 48 may be appropriately set depending on the size of the signal processing electronic circuit unit of the sensor chip 16 so as to block the electric field undesirable for the signal processing electronic circuit unit of the sensor chip 16.

Accordingly, as a consequence of disposing the shielding plate 48 having the same electric potential as that of signal processing electronic circuit unit of the sensor chip 16 between the diaphragm 32 and the sensor chip 16, an electric field to act on the sensor chip 16, which occurs due to the potential difference between the diaphragm 32 having the same electric potential as that of the primary power supply (not shown) of the unit and the control circuit (not shown) side, is blocked by the shielding plate 48. Moreover, since the electric potential of the shielding plate 48 and that of the sensor chip 16 are set to the same electric potential, no electric field occurs therebetween. For this reason, because the potential difference that occurs between the sensor chip 16 and the diaphragm 32 does not act on the sensor chip 16, it is possible to prevent the effect on the electronic circuit in the sensor chip 16.

Figure 7:
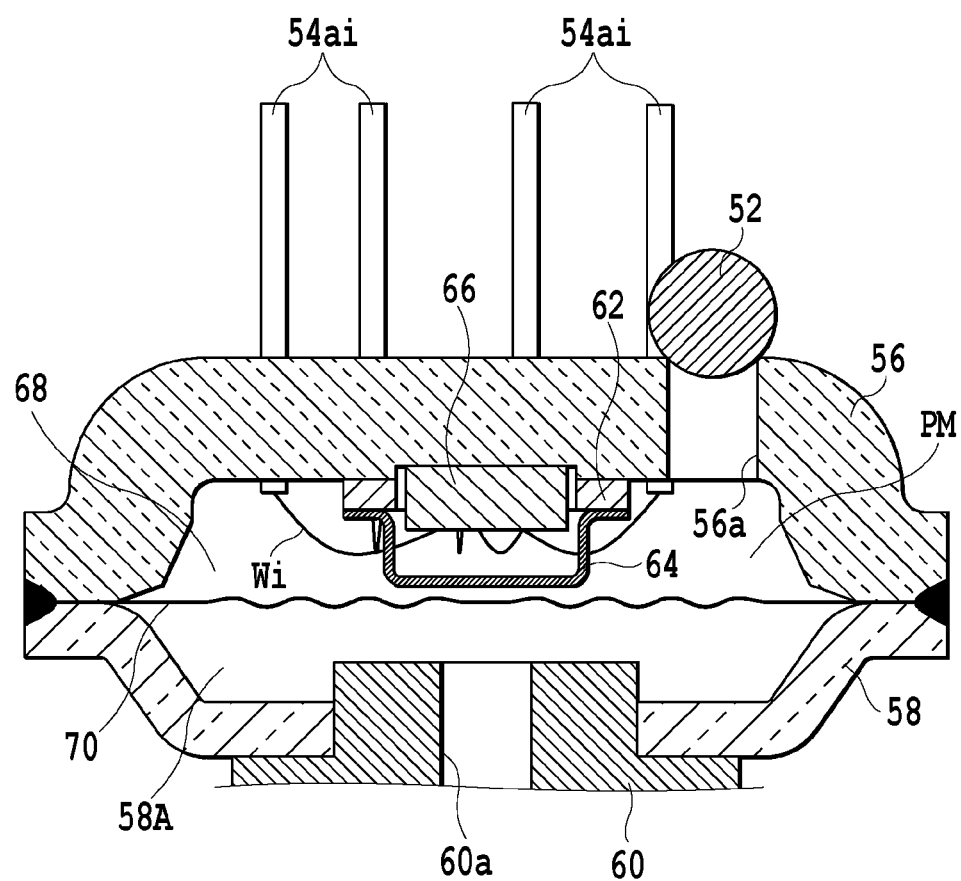
FIG. 7 is a cross-sectional view showing the essential parts of still another example of the shield structure for a pressure sensor according to the present invention.

FIG. 7 partially shows a configuration of the pressure sensor applying still another example of the shield structure for a pressure sensor according to the present invention.

A pressure sensor shown in FIG. 7 comprises: a joint member 60 to be coupled to a piping into which a fluid supposed to undergo pressure detection is introduced; and a sensor housing 56 made of metal, joined to the joint member 60 and a base plate 58 by brazing or the like, and configured to accommodate a sensor unit to be described later.

One of open ends of a port 60a of the joint member 60 is open toward a pressure chamber 58A formed between the base plate 58 of the joint member 60 and a diaphragm 70 of the sensor unit.

The sensor unit for detecting a pressure inside the pressure chamber 58A and sending a detection output signal comprises, as its main elements, the diaphragm 70 made of metal and configured to isolate the pressure chamber 58A from an inner peripheral portion of the sensor housing 56, a sensor chip 66 provided with a plurality of pressure detection elements and a signal processing electronic circuit unit to process signals from the pressure detection elements, a conductive plate 62 provided with a hole into which an outer peripheral portion of the sensor chip 66 is inserted and configured to surround the sensor chip 66, and a group of input-output terminals 54ai (i=1 to 8) electrically connected to the sensor chip 66.

The diaphragm 70 made of metal is welded and fixed between a joining end of the sensor housing 56 mentioned above and a joining end of the base plate 58. As a consequence, the electric potential of the sensor housing 56 is set to the same electric potential as the electric potentials of the diaphragm 70 and the like because the sensor housing 56 is connected to and conducted with the diaphragm 70, the base plate 58, and the joint member 60.

Figure 8:
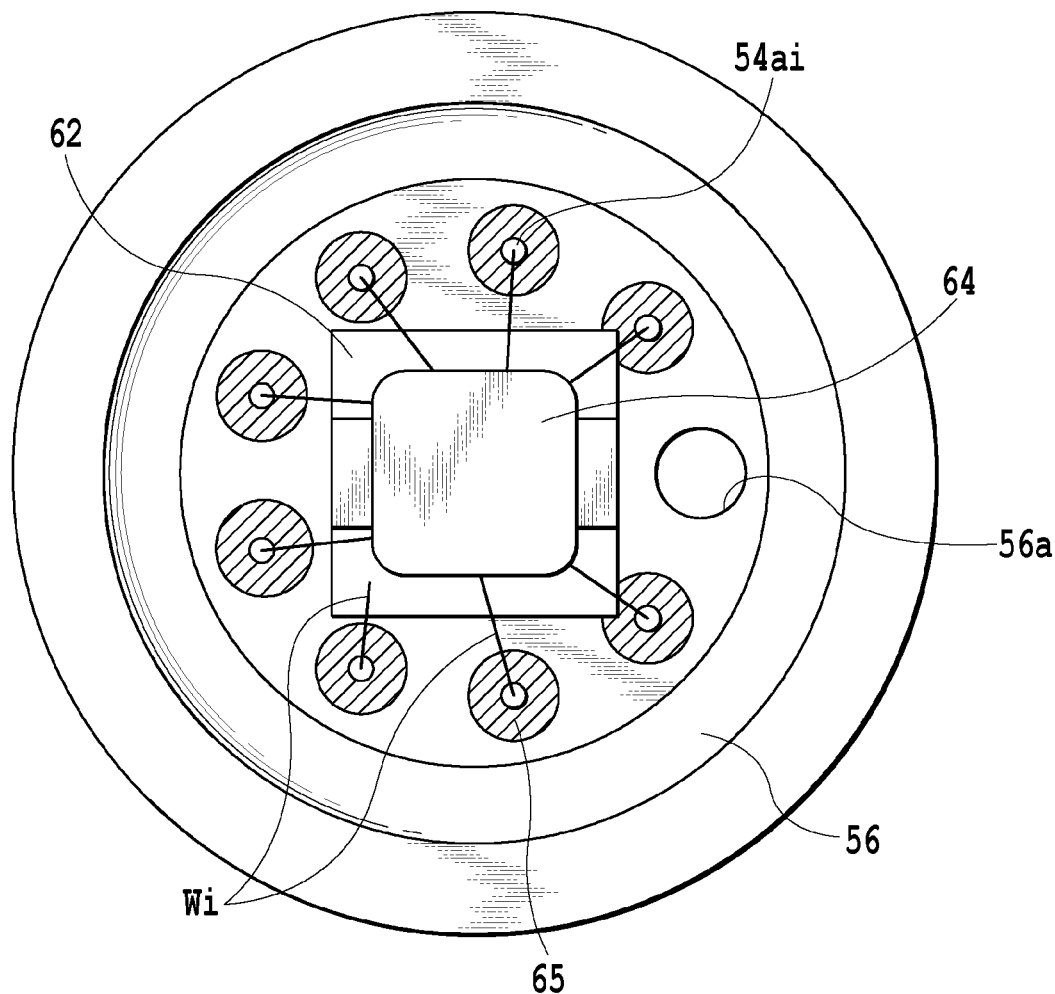
FIG. 8 is a plan view showing the electric field blocking member in the liquid sealing chamber in the example shown in FIG. 7.

A liquid sealing chamber 68 which is a hermetically sealed space formed from the diaphragm 70 and the inner peripheral portion of the sensor housing 56 is filled with a predetermined amount of the pressure transmitting medium PM such as a silicone oil and a fluorine-based inert liquid. After the pressure transmitting medium PM is put in via a hole 56a in the sensor housing 56, the hole 56a is closed with a plug member 52. The group of input-output terminals 54ai are supported while being insulated from the sensor housing 56 by using hermetic glass 65 (see FIG. 8). The group of input-output terminals 54ai are connected to the sensor chip 66 by using the bonding wires Wi.

In the liquid sealing chamber 68, the rectangular conductive plate 62 is supported by an inner peripheral surface of the sensor housing 56 in such a way as to surround the sensor chip 66, for example. The conductive plate 62 is made of an insulating material which is one of resin, glass, and ceramic, and one of end surfaces thereof is formed out of a metallic film and integrated with the metallic film of gold, silver, copper, aluminum, or the like serving as a conductive layer, which is formed by adherence, vapor deposition, plating, or the like. The one end surface of the conductive plate 62 being the conductive layer is opposed to the diaphragm 70 and the other end surface being an insulating layer is supported by the sensor housing 56. In addition, a shielding member 64 serving as the electric field blocking member is provided between one of end surfaces of the sensor chip 66 and the diaphragm 70 in the liquid sealing chamber 68.

Figure 12A:
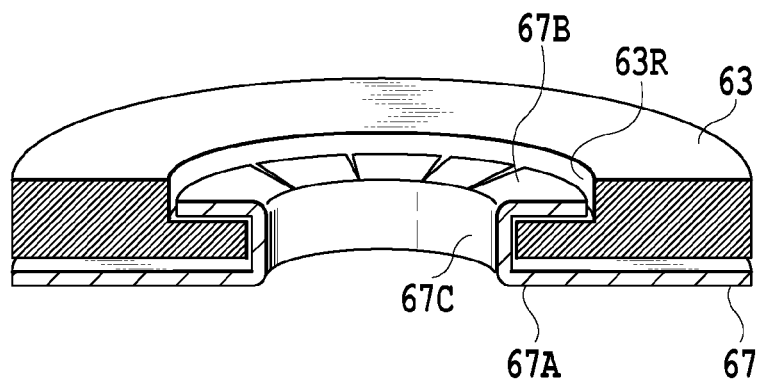
FIG. 12A is a perspective view showing another example of a conductive plate used in the example shown in FIG. 7 inclusive of a partial cross-section.

Moreover, the conductive plate may be comprised of a core member 63 made of an insulating material and a cover member 67 made of a conductive material and configured to cover the core member 63 as shown in FIG. 12A, for example. Note that illustration of the shielding member 64 is omitted in FIGS. 12A to 12C.

Figure 12B:
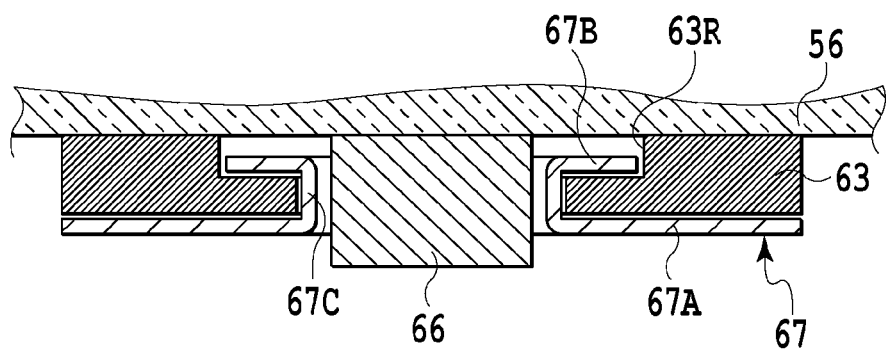
FIG. 12B is a cross-sectional view showing a state in which the conductive plate shown in FIG. 12A is attached to a sensor housing.

The annular core member 63 has a stepped portion 63R provided on an inner peripheral edge portion and located adjacent to one end surface. The cover member 67 comprises a disk portion 67A that covers the other end surface of the core member 63 facing the diaphragm 70, an inner peripheral edge portion 67C continued to the disk portion 67A and configured to cover an inner peripheral portion of the core member 63, and a fixing portion 67B continued to the inner peripheral edge portion 67C and fixed to the stepped portion 63R of the core member 63 by swage processing. The one end surface of the core member 63 of the conductive plate is adhered to the inner peripheral surface of the sensor housing 56. At that time, as shown in FIG. 12B, predetermined clearances are formed between the fixing portion 67B of the cover member 67 in the conductive plate and the inner peripheral surface of the sensor housing 56 as well as between an outer peripheral surface of the sensor chip 66 and the inner peripheral edge portion 67C of the cover member 67 in the conductive plate, thus preventing the sensor housing 56 from coming into contact with the cover member 67.

Figure 12C:
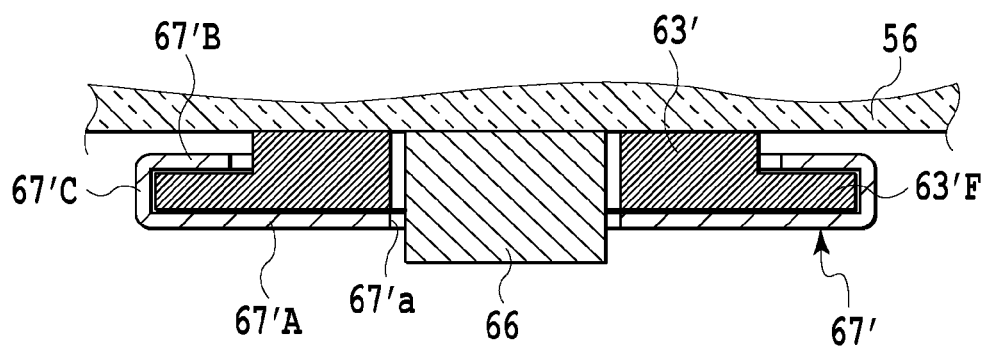
FIG. 12C is a cross-sectional view showing still another example of the conductive plate used in the example shown in FIG. 7 in a state of being attached to the sensor housing.

Furthermore, the conductive plate may be comprised of a core member 63' made of an insulating material and a cover member 67' made of a conductive material and configured to cover the core member 63' as shown in FIG. 12C, for example. The annular core member 63' has a thin overhang portion 63'F provided on an outer peripheral edge portion. The cover member 67' comprises a disk portion 67'A that covers the other end surface of the core member 63' facing the diaphragm 70, an outer peripheral edge portion 67'C continued to the disk portion 67'A and configured to cover an outer peripheral portion of the overhang portion 63'F of the core member 63', and a fixing portion 67'B continued to the outer peripheral edge portion 67'C and fixed to one of end surfaces of the overhang portion 63'F of the core member 63' by swage processing. An end surface around an inner peripheral edge portion of the core member 63' of the conductive plate is adhered to the inner peripheral surface of the sensor housing 56. At that time, as shown in FIG. 12C, predetermined clearances are formed between the fixing portion 67'B of the cover member 67' in the conductive plate and the inner peripheral surface of the sensor housing 56, as well as between the outer peripheral surface of the sensor chip 66 and an inner peripheral edge portion 67'a of the cover member 67' in the conductive plate as well as an inner peripheral surface of the core member 63', thus preventing the sensor housing 56 from coming into contact with the cover member 67'.

The shielding member 64 may be formed from a conductive metal material such as stainless steel, copper, and aluminum, for example. Alternatively, the shielding member 64 may be formed from an insulating material such as resin, glass, and ceramic with one of its surface layers being formed and integrated with a conductive metallic film formed by adhesion, vapor deposition, sputtering, plating, and the like. That is to say, the shielding member 64 is supported by the sensor housing 56 set to the same electric potential as a primary side electric potential by using an insulator (the insulating layer of the conductive plate 62).

The shielding member 64 is designed to entirely cover the one end surface of the sensor chip 66 while providing a predetermined clearance and thus to block an electric field undesirable for a signal processing electronic circuit unit of the sensor chip 66. A pair of fixing end portions of the shielding member 64 and the conductive plate 62 are joined to and conducted with one another through conductive surfaces. The one end surface of the conductive plate 62 being the conductive surface is joined to and conducted with one or more of the group of input-output terminals 54ai, e.g. a zero (V) group of input-output terminals 54ai through the bonding wire Wi. According to this configuration described above, the electric potentials of the shielding member 64 and the conductive plate 62 are set to the same electric potential as the electric potential of the electronic circuit mounted in the sensor chip 66.

Accordingly, as a consequence of disposing the shielding member 64 having the same electric potential as that of the signal processing electronic circuit unit of the sensor chip 66 between the diaphragm 70 and the one end surface of the sensor chip 66, an electric field to act on the sensor chip 66, which occurs due to a potential difference between the diaphragm 70 having the same electric potential as that of the primary power supply (not shown) of the unit and the control circuit (not shown) side, is blocked by the shielding member 64. Moreover, since the electric potential of the shielding member 64 and the electric potential of the sensor chip 66 are set to the same electric potential, no electric field occurs therebetween. For this reason, because the potential difference that occurs between the sensor chip 66 and the diaphragm 70 does not act on the sensor chip 66, it is possible to prevent an effect on the electronic circuit in the sensor chip 66.

Figure 9:
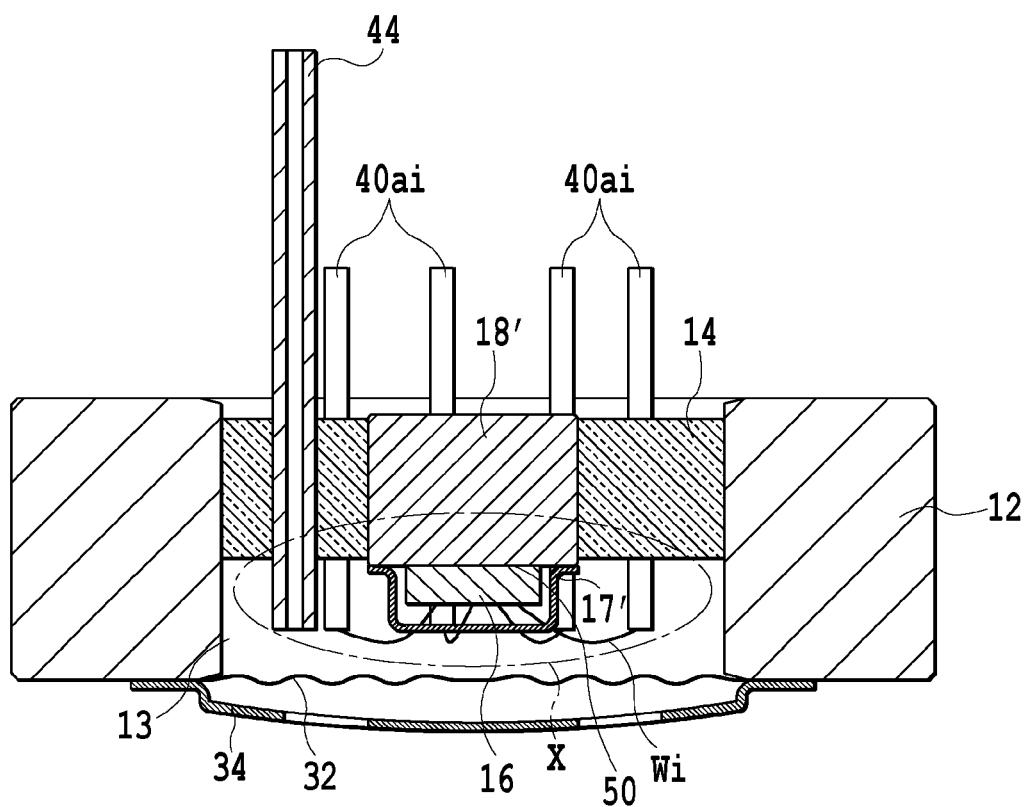
FIG. 9 is a cross-sectional view showing the essential parts of still another example of the shield structure for a pressure sensor according to the present invention.

FIG. 9 partially shows the essential parts of the pressure sensor applying still another example of the shield structure for a pressure sensor according to the present invention.

In the example shown in FIG. 1, the four fixing end portions of the cap-shaped shielding member 17 are brought close to the outer peripheral portion of the sensor chip 16 on the end surface of the disk conductive plate 19 and are joined to the end surface. Instead, an example shown in FIG. 9 is designed such that a shielding plate 17' is joined to an end surface of a chip mounting member 18' facing the liquid sealing chamber 13.

Figure 10:
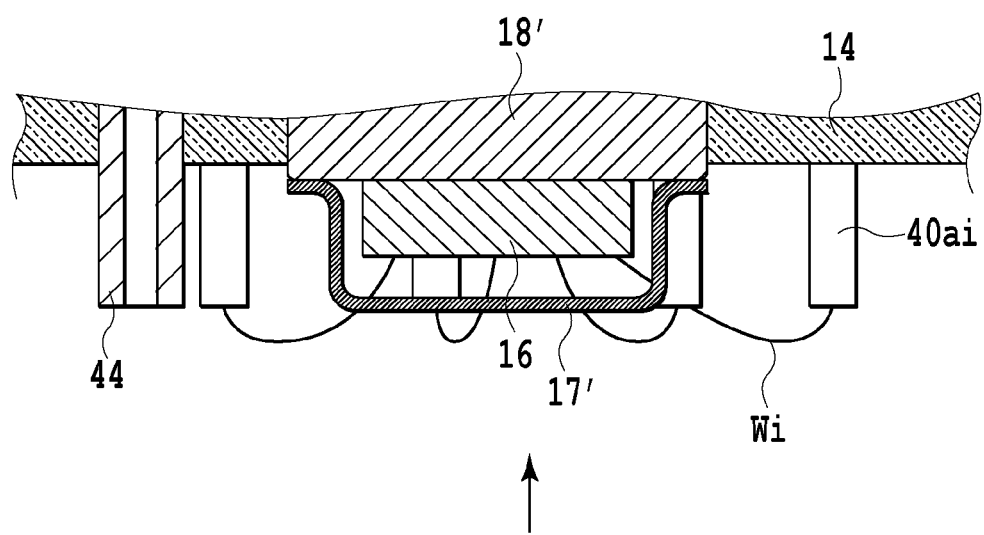
FIG. 10 is a partial enlarged view showing a partial enlarged portion X in the example shown in FIG. 9.
Figure 11:
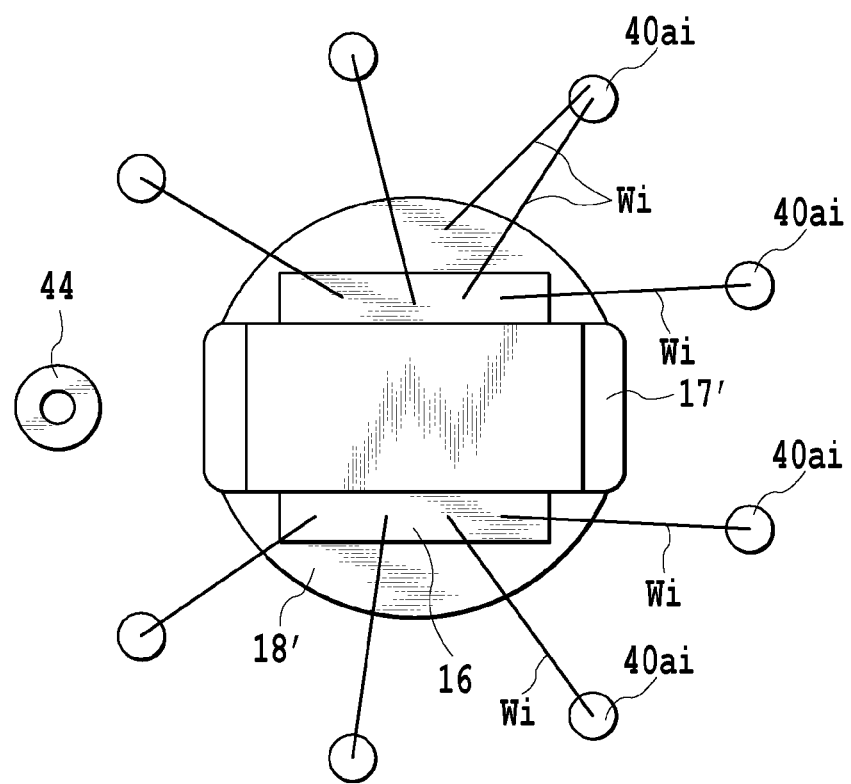
FIG. 11 is an arrow view of the electric field blocking member provided in the liquid sealing chamber, which is viewed from an arrow illustrated in FIG. 10.

Note that constituents in FIGS. 9 to 11 which are the same as the constituents in the example shown in FIG. 1 will be indicated by the similar reference characters and overlapping explanations thereof will be omitted.

The sensor chip 16 is adhered to one end portion of the chip mounting member 18' located on the inside of the liquid sealing chamber 13 through the adhesive layer 50, for example. As shown in FIG. 9, the external size of the sensor chip 16 having the substantially rectangular shape is set smaller than a diameter of the chip mounting member 18'. The chip mounting member 18' is connected to and conducted with one or more of the group of input-output terminals 40ai, e.g. the zero (V) input-output terminal through the bonding wire Wi, for example.

The shielding plate 17' serving as the electric field blocking member is provided between the one end surface of the sensor chip 16 and the diaphragm 32 in the liquid sealing chamber 13. The shielding plate 17' is configured to block the electric field undesirable for the signal processing electronic circuit unit of the sensor chip 16. The shielding plate 17' may be formed from a conductive metal material such as stainless steel, copper, and aluminum, for example. Alternatively, the shielding plate 17' may be formed from an insulating material such as resin, glass, and ceramic with one of its surface layers being formed and integrated with a conductive metal film formed by adhesion, vapor deposition, sputtering, plating, and the like.

Fixing end portions of the strip-shaped shielding plate 17' are brought close to the outer peripheral portion of the sensor chip 16 at one end portion of the chip mounting member 18', and are joined to the end portion and conducted with the end portion. According to this configuration, the electric potentials of the shielding plate 17' and the chip mounting member 18' are set to the same electric potential as the electric potential of the electronic circuit mounted in the sensor chip 16.

A predetermined clearance is formed between the one end surface of the sensor chip 16 and a portion of the shielding plate 17' facing the one end surface of the sensor chip 16. Note that an external size and a width dimension of the shielding plate 17' may be appropriately set according to the size of the signal processing electronic circuit unit of the sensor chip 16 so as to block the electric field undesirable for the signal processing electronic circuit unit of the sensor chip 16.

Further, in this case, the group of input-output terminals 40ai and the bonding wires Wi are connected to the chip mounting member 18'. However, without limitation to this example, the group of input-output terminals 40ai and the bonding wires Wi may be connected directly to the shielding member 17'.

Accordingly, as a consequence of disposing the shielding plate 17' having the same electric potential as that of the signal processing electronic circuit unit of the sensor chip 16 between the diaphragm 32 and the sensor chip 16, an electric field to act on the sensor chip 16, which occurs due to the potential difference between the diaphragm 32 having the same electric potential as that of the primary power supply (not shown) of the unit and the control circuit (not shown) side, is blocked by the shielding plate 17'. Moreover, since the electric potential of the shielding plate 17' and that of the sensor chip 16 are set to the same electric potential, no electric field occurs therebetween. For this reason, because the potential difference that occurs between the sensor chip 16 and the diaphragm 32 does not act on the sensor chip 16, it is possible to prevent an effect on the electronic circuit in the sensor chip 16.

As it is clear from the foregoing description, according to an example of a shield structure for a pressure sensor according to the present invention, an effect (a variation in output from the pressure sensor) on the electronic circuit in the sensor chip attributed to the electric potentials occurring between the sensor chip 16 or 66 and the diaphragm 32 or 70 in the pressure sensor is avoided by using any of the shielding plates 17' and 48, the shielding members 17 and 64, and the conductive plates 19 and 62. Therefore, an effect of the electric field occurring between the sensor chip and the metallic diaphragm in the pressure sensor will be reduced without causing increases in the number of components and in assembly operation processes.

The invention claimed is:

1. A shield structure for a pressure sensor comprising:
  a sensor unit including a sensor chip for detecting a pressure and sending a detection output signal, a chip mounting member supporting the sensor chip, a diaphragm for partitioning a liquid sealing chamber which the sensor chip and the chip mounting member are placed into a pressure chamber facing the liquid sealing chamber, and a group of input-output terminals supported by a hermetic glass and electrically connected to the sensor chip; and
  an electric field blocking member placed between one end surface of the sensor chip in the liquid sealing chamber and the diaphragm and supported from one end surface of a flat-shaped conductive plate having one end surface formed of a conductive layer which is opposed to the diaphragm and the other end surface formed of an insulating layer supported on the hermetic glass, the electric field blocking member electrically connected to the group of input-output terminals, and for blocking an electric field acting on a signal processing electronic circuit unit of the sensor chip.

2. The shield structure for a pressure sensor according to claim 1, wherein the conductive plate and the signal processing electronic circuit unit of the sensor chip have an equal electric potential.

3. A shield structure for a pressure sensor comprising:
  a sensor unit including a sensor chip for detecting a pressure and sending a detection output signal, a diaphragm for partitioning a liquid sealing chamber which the sensor chip is placed into a pressure chamber facing the liquid sealing chamber, and a group of input-output terminals electrically connected to the sensor chip, a sensor housing forming the liquid sealing chamber in conjunction with the diaphragm; and
  an electric field blocking member placed between one end surface of the sensor chip in the liquid sealing chamber and the diaphragm and supported from one end surface of a flat-shaped conductive plate having one end surface formed of a conductive layer which is opposed to the diaphragm and the other end surface formed of an insulating layer supported on an inner peripheral surface of the sensor housing, the electric field blocking member electrically connected to the group of input-output terminals, and for blocking an electric field acting on a signal processing electronic circuit unit of the sensor chip.

4. The shield structure for a pressure sensor according to claim 3, wherein the conductive plate is placed on an inner peripheral surface of a sensor housing that accommodates the sensor unit and is electrically connected to the group of input-output terminals.

5. The shield structure for a pressure sensor according to claim 3, wherein the conductive plate and the signal processing electronic circuit unit of the sensor chip have an equal electric potential.

6. A shield structure for a pressure sensor comprising:
  a sensor unit including a sensor chip for detecting a pressure and sending a detection output signal, a chip mounting member supporting the sensor chip, a diaphragm for partitioning a liquid sealing chamber which the sensor chip and the chip mounting member are placed into a pressure chamber facing the liquid sealing chamber, and a group of input-output terminals supported by a hermetic glass and electrically connected to the sensor chip; and
  a strip-shaped shielding plate which is placed between one end surface of the sensor chip in the liquid sealing chamber and the diaphragm and passes immediately above a central part of the sensor chip with a predetermined clearance, the strip-shaped shielding plate having at least one fixing portion which is placed so as to come close to an outer peripheral portion of the sensor chip at one end portion of the chip mounting member on an end surface of the hermetic glass and is electrically connected to the group of input-output terminals and is positioned by one input-output terminal of the group of input-output terminals or an oil filling pipe, and for blocking an electric field acting on a signal processing electronic circuit unit of the sensor chip.

7. The shield structure for a pressure sensor according to claim 6, wherein the fixing portion of the strip-shaped shielding plate and the signal processing electronic circuit unit of the sensor chip have an equal electric potential.

8. A shield structure for a pressure sensor comprising:
  a sensor unit including a sensor chip configured for detecting a pressure and sending a detection output signal, a metal chip mounting member having a diameter greater than the external size of the sensor chip and for supporting the sensor chip, a diaphragm for partitioning a liquid sealing chamber which the sensor chip and the chip mounting member are placed into a pressure chamber facing the liquid sealing chamber, and a group of input-output terminals electrically connected to the sensor chip and to the chip mounting member; and
  an electric field blocking member fixed between one end surface of the sensor chip in the liquid sealing chamber and the diaphragm and brought close to an outer peripheral portion of the sensor chip on an end surface of the chip mounting member and electrically connected to the group of input-output terminals, and for blocking an electric field acting on a signal processing electronic circuit unit of the sensor chip.

9. The shield structure for a pressure sensor according to claim 8, wherein the electric field blocking member and the signal processing electronic circuit unit of the sensor chip have an equal electric potential.

10. A pressure sensor comprising:
  a sensor unit including a sensor chip for detecting a pressure and sending a detection output signal, a chip mounting member supporting the sensor chip, a diaphragm for partitioning a liquid sealing chamber which the sensor chip and the chip mounting member are placed into a pressure chamber facing the liquid sealing chamber, and a group of input-output terminals supported by a hermetic glass and electrically connected to the sensor chip;
  an electric field blocking member placed between one end surface of the sensor chip in the liquid sealing chamber and the diaphragm and supported from one end surface of a flat-shaped conductive plate having one end surface formed of a conductive layer which is opposed to the diaphragm and the other end surface formed of an insulating layer supported on the hermetic glass, the electric field blocking member electrically connected to the group of input-output terminals, and for blocking an electric field acting on a signal processing electronic circuit unit of the sensor chip; and
  a sensor unit accommodating portion storing the sensor unit and the electric field blocking member.

11. The pressure sensor according to claim 10, wherein the electric field blocking member and the signal processing electronic circuit unit of the sensor chip have an equal electric potential.

12. A pressure sensor comprising:
- a sensor unit including a sensor chip for detecting a pressure and sending a detection output signal, a diaphragm for partitioning a liquid sealing chamber which the sensor chip is placed into a pressure chamber facing the liquid sealing chamber, and a group of input-output terminals electrically connected to the sensor chip, a sensor housing forming the liquid sealing chamber in conjunction with the diaphragm;
- an electric field blocking member placed between one end surface of the sensor chip in the liquid sealing chamber and the diaphragm and supported from one end surface of a flat-shaped conductive plate having one end surface formed of a conductive layer which is opposed to the diaphragm and the other end surface formed of an insulating layer supported on an inner peripheral surface of the sensor housing, the electric field blocking member electrically connected to the group of input-output terminals, and for blocking an electric field acting on a signal processing electronic circuit unit of the sensor chip; and
- a sensor unit accommodating portion storing the sensor unit and the electric field blocking member.

13. The pressure sensor according to claim 12, wherein the electric field blocking member and the signal processing electronic circuit unit of the sensor chip have an equal electric potential.

* * * * *